(12) United States Patent
Chen

(10) Patent No.: US 9,387,422 B2
(45) Date of Patent: Jul. 12, 2016

(54) EMBEDDED TYPE, INVERTED-FILTERING AND ANTI-CLOGGED EMITTER AND DRIP IRRIGATION PIPELINE

(71) Applicant: SHANGHAI YINE GREEN TECHNOLOGY CO., LTD., Shanghai (CN)

(72) Inventor: Libin Chen, Shanghai (CN)

(73) Assignee: SHANGHAI YINE GREEN TECHNOLOGY CO., LTD., Minhang District, Shanghai (CN)

( * ) Notice: Subject to any disclaimer, the term of this patent is extended or adjusted under 35 U.S.C. 154(b) by 0 days.

(21) Appl. No.: 14/400,465

(22) PCT Filed: May 10, 2013

(86) PCT No.: PCT/CN2013/075479
§ 371 (c)(1),
(2) Date: Nov. 11, 2014

(87) PCT Pub. No.: WO2013/170728
PCT Pub. Date: Nov. 21, 2013

(65) Prior Publication Data
US 2015/0136686 A1    May 21, 2015

(30) Foreign Application Priority Data
May 17, 2012 (CN) .......................... 2012 1 0160801

(51) Int. Cl.
| | |
|---|---|
| *B01D 35/02* | (2006.01) |
| *B01D 29/90* | (2006.01) |
| *A01G 25/02* | (2006.01) |
| *A01G 25/16* | (2006.01) |
| *A01G 25/00* | (2006.01) |
| *B05B 1/20* | (2006.01) |
| *B05B 15/00* | (2006.01) |

(52) U.S. Cl.
CPC ............... *B01D 35/02* (2013.01); *A01G 25/00* (2013.01); *A01G 25/02* (2013.01); *A01G 25/023* (2013.01); *A01G 25/16* (2013.01); *B01D 29/90* (2013.01); *B05B 1/20* (2013.01); *B05B 15/008* (2013.01)

(58) Field of Classification Search
CPC ........ B01D 35/02; B01D 29/90; A01G 25/02; A01G 25/023; A01G 25/06; A01G 25/16
See application file for complete search history.

(56) References Cited

U.S. PATENT DOCUMENTS

| | | | | |
|---|---|---|---|---|
| 3,901,448 A | * | 8/1975 | Babin | 239/145 |
| 5,813,603 A | * | 9/1998 | Kurtz | 239/1 |
| 5,996,909 A | * | 12/1999 | Lin | 239/542 |
| 7,681,805 B2 | * | 3/2010 | Belford et al. | 239/11 |
| 2009/0041544 A1 | * | 2/2009 | Ramsey | 405/129.95 |

(Continued)

*Primary Examiner* — Katherine Zalasky
*Assistant Examiner* — Benjamin Lebron
(74) *Attorney, Agent, or Firm* — Tianhua Gu; Global IP Services

(57) ABSTRACT

An embedded type, inverted-filtering and anti-clogging emitter comprises a first component and a second component which are mutually fixed, and a filter cloth sandwiched between the first component and the second component; the first component is provided with a hollowed-out portion which is capable of exposing the filter cloth, and the second is provided with a pressing portion to press the filter cloth against the first component, which completely covers the hollowed-out portion on the projection plane, and presses against the filter cloth along the edge of the hollowed-out portion, whereby water in the water pipeline has to successively pass through the diversion channel, the filter cloth pressed by the pressing portion, and the hollowed-out portion to the water outlet.

4 Claims, 3 Drawing Sheets

(56) References Cited

U.S. PATENT DOCUMENTS

| | | | |
|---|---|---|---|
| 2009/0302127 A1* | 12/2009 | Lutzki et al. | 239/11 |
| 2010/0282873 A1* | 11/2010 | Mattlin et al. | 239/542 |
| 2012/0181357 A1* | 7/2012 | Zhu | 239/575 |
| 2012/0267454 A1* | 10/2012 | Einav et al. | 239/542 |

\* cited by examiner

EMBEDDED TYPE, INVERTED-FILTERING AND ANTI-CLOGGED EMITTER AND DRIP IRRIGATION PIPELINE

CROSS REFERENCE TO RELATED PATENT APPLICATION

The present application is the US national stage of PCT/CN2013/075476 filed on May 10, 2013, which claims the priorities of the Chinese patent applications No. 201210160801.5 filed on May 17, 2012, which applications are incorporated herein by reference.

BACKGROUND OF THE PRESENT INVENTION

1. Field of Invention

The present invention relates to the technical field of plant irrigation, particularly relates to an embedded type, inverted-filtering and anti-clogging emitter, and a drip irrigation pipe (tape) having the embedded type, inverted-filtering and anti-clogging emitter.

2. Description of Related Arts

Drip irrigation is an irrigation method directly conveying water and nutrient required for the growth of crops to the soil around crop roots uniformly and accurately in a smaller flow, by taking water with certain pressure pass through a piping system and an emitter(s) mounted on a last level of pipe (capillary). Drip irrigation avoids damaging soil structure, makes water, manure, air, heat keep in good condition that is suitable for the growth of crops, has little evaporation loss of water, avoids the appearance of surface runoff, barely has deep leakage, and has became one of the most water saving irrigation technologies so far.

Drip irrigation may be divided into surface drip irrigation and subsurface drip irrigation modes. For the surface drip irrigation, capillary is arranged above the ground; for the subsurface drip irrigation, both capillary and emitter (water dripper) are buried underground. Compared to the surface drip irrigation, subsurface drip irrigation has effects of better water saving, soil saving and environment conservation, and increasing yields as well.

Emitter is a core component of a drip irrigation system, and its role is to take water spread around under the emitter in a manner of unsaturated flow in soil as water drops or seeps in a constant low flow through the emitter, by using the energy dissipation and pressure reduction of the tiny flow channel of the emitter. In order to make drip irrigation system truly achieve the desired objectives, the emitter shall meet the following requirements: (1) it is small, uniform and stable in discharging flow, and is little in sensitivity to water pressure change; (2) it has good anti-clogging performance; (3) it has a simple structure, is convenient to manufacture, lay and install.

At present, there are three kinds of commonly used emitters (water dripper) of drip irrigation systems, which are mono-wing labyrinth type, embedded type, and pressure compensated type. Therein, for the mono-wing labyrinth type, a side or a middle part of the pipe is overall hot pressed once to form various shapes of flow channels while manufacturing thin walled pipe. For the embedded type, the previously manufactured emitter is embedded in the capillary during the manufacturing process of the capillary. For the pressure compensated type, the shapes of the elastomer component or flow channel are changed in virtue of water flow pressure, so that the area of the section over the water surface changes, thereby causing the outflow of the water dripper small and stable. At present, all the above several emitters (water dripper) adopt the method that directly arranges tiny flow channels with turbulent state for the emitters to achieve in energy dissipation and pressure reduction. It not only requires for high accuracy of flow channel manufacture, by a slight deviation of which, a great effect on the outflow capacity of the emitter may be caused, but also usually configures a flow channel section of 0.3~1.0 millimeter, to cause the large flow cross-section generate larger pressure loss and smaller flow rate at the position of water dripper, whereas such configuration with single and tiny flow channel is apt to cause clogging, and even by increasing investment of filtration and other facilities, it is still difficult to be avoided, especially difficult to prevent biological and chemical clogging.

However, if slightly enlarging the cross-section of the flow channel, it would be less prone to controlling flow rate, which not only is waste of water, but also affects the uniformity and effectiveness of irrigation.

When the current commonly used drip irrigation pipes (tapes) are employed for surface drip irrigation, there still exists problems of being prone to clogging, higher requirement in water quality and poor uniformity and the like; moreover, the clogging problem would be even worse as being employed for subsurface drip irrigation. Therefore, it is a key issue to promote further development and application of drip irrigation that how to synchronously solve the flow control of the drip irrigation and the problem of preventing the clogging of the drip irrigation of the drip irrigation system.

SUMMARY OF THE PRESENT INVENTION

The object of the present invention is to provide an embedded type, inverted-filtering and anti-clogging emitter, and a drip irrigation pipe (tape) having an embedded type, inverted-filtering and anti-clogging emitter, to overcome the existing disadvantages of the prior art.

In order to achieve the above object, the embedded type, inverted-filtering and anti-clogging emitter provided by the present invention, is embedded fixed to a inner wall of a water pipeline, it comprises a first component and a second component which are mutually fixed, and a filter cloth sandwiched between the first component and the second component; wherein, the first component and/or the second component are provided with a diversion channel for water passing through the water pipeline to enter the emitter and to contact the filter cloth, the first part is also provided with a water outlet channel which is capable of exposing the filter cloth and enabling the filter cloth to communicate with a water outlet of the water pipeline, the part around the water outlet channel is fixed with the inner wall of the water pipeline, and the filter cloth sandwiched between the first component and the second component is a medium leading the diversion channel to the water outlet channel for seepage, so that water passing through the water pipeline has to successively pass through the diversion channel, the filter cloth and the water outlet channel, to seep from the water outlet to the water pipeline.

Further, the filter cloth sandwiched between the first component and the second component is the only medium leading the diversion channel to the water outlet channel for seepage, the water passing through the water pipeline seeps from the diversion channel into the water outlet channel by the filter cloth clamped between the first component and the second component. That is to say, the direction perpendicular to or nearly perpendicular to the pressing direction of the filter cloth is the seepage direction of water, rather than directly longitudinal seeping along the cross-section of the filter cloth, thus, it would not cause the consequence of excessive seepage.

A particular technical solution of the present invention is that: the second component is box-shape; the first component is rectangular shape that enables to be snapped in the box-shaped second component. The first component is provided with a hollowed-out portion which is capable of exposing the filter cloth and enabling the filter cloth to correspond with and to be in communication with the water outlet of the water pipeline, the filter cloth complete covers the hollowed-out portion to form a water seepage portion. The second component is provided with a pressing portion to make the filter cloth press against the first component, the second component is also provided with a diversion port which enables the water passing through the water pipeline to enter the emitter and to contact with the filter cloth. The portion around the hollowed-out portion of the emitter is mutually fixed with the inner wall of the water pipeline, such that the water passing through the water pipeline would not directly enter the hollowed-out portion.

Further, the pressing portion completely covers the hollowed-out portion on the projection plane, and presses against the filter cloth along the edge of the hollowed-out portion, such that the water passing through the water pipeline has to pass through the filter cloth at the pressing portion to enter the hollowed-out portion to seep from the delivery port.

Further, the filter cloth has a suction portion adjacent to the pressing part pressed by the pressing portion, which further extends to the diversion channel.

Further, four sides of the first component are reversed taper slopes, which are convenient for snapping the second component to mutually fit and sealed fix.

Further, the sides of the first component are provided with rib or groove, the corresponding position of the second component are provided with groove or rib mutually matched with the rib or groove.

Another particular technical solution of the present invention is that: the first component is a dumbbell-shaped first tubular column assembly; the second component is a cylinder-shaped second tubular column assembly that enables to insert into and fix with one end of the first tubular column assembly. A circle in the middle of the first tubular column assembly sags inward towards to the axis, to make the whole form a dumbbell-shape with broad tubular columns at both ends and a narrow tubular column in the middle, that is coaxial with the second tubular column assembly and is transparent in axis, so as to form a diversion channel to enable water to enter the emitter. On the annular surface of the outer wall of the broad tubular column of one end that connects with the outer wall of the narrow tubular column, is provided one or more water seepage holes along the direction parallel to the axis. The end of the broad tubular column provided with water seepage holes is inserted with the second tubular column assembly and fixed. An inner ring of the water seepage holes of the broad tubular column is protruded against with a top ring of the second tubular column assembly, an annular filter cloth is sandwiched therebetween, and the filter cloth is hollow to make the axes of the two tubular column assemblies transparent. The water seepage holes expose the filter cloth and are communication with the water outlet of the water pipeline to form the water outlet channel. The outer walls of the broad tubular columns at both ends of the first tubular column assembly are mutually fixed with the inner wall of the water pipeline.

Further, the circle of concave position in the middle of the first tubular column assembly corresponds to the water outlet of the water pipeline, to constitute a part of the water outlet channel.

Further, a part of or complete filter cloth after assembling is exposed to the water seepage holes.

Further, the outer wall of the second tubular column assembly is provided with a rib or groove, the end of the broad tubular column provided with water seepage holes has a groove or rib mutually matched with the rib or groove.

Further, the filter cloth is synthetic fiber.

Further, the filter cloth is non-woven fabrics.

Further, the filter cloth is geotechnical cloth.

Further, the thickness of the geotechnical cloth after being clamped is ¼-¾ times of natural thickness.

The filter cloth used in the present invention is preferably geotechnical cloth. Filter cloth, on one hand, can prevent impurities in water from clogging the water outlet channel, on the other hand, and can control the velocity of water seepage. It is to be noted that, the filter cloth used in the present invention is not limited to the geotechnical cloth, commonly used filtering medium woven with natural fiber or synthetic fiber, e.g., cotton, linen, wool, bave, asbestos fiber, glass fiber, polypropylene, polyester, chinlon, vinylon, and the like, also can be used for the present invention.

The present invention further provides a drip irrigation pipeline (drip irrigation pipe, drip irrigation tape) having the embedded type, inverted-filtering and anti-clogging emitter, which comprises a pipeline body and a plurality of above emitters arranged at the inner wall of the pipeline body.

By adopting the above technical solution, the present invention has the following technical effects of positive progress.

1. It enables to prevent physical clogging and chemical and biological clogging, and thoroughly breaks the worldwide problem of easily clogging of an embedded type dripper emitter, and is wide in application range. The present invention subverts the research and development ideas at home and abroad nowadays that attempts to strengthen the anti-clogging property of an embedded type drip irrigation pipe (tape) by adopting the methods such as reinforcing filtration, enlarging flow channel, increasing water inlet and water outlet and the like, and originality applies the mechanism of "treat clogging with clogging". By adopting a special structure design, it ensures that the water passing through the water pipeline seeps after successively passes through the diversion channel, filter cloth, water outlet channel, and makes the filter cloth directly contact with water in pipeline, and makes the filter cloth close to the water outlet of the pipeline as possible to ensure the water outlet channel from being clogging. The filter cloth, such as geotechnical cloth has a function of inverted-filtering, and has numerous gaps of net structure inside. After being filled with a variety of organic and inorganic materials, those gaps would be the gaps that are small enough to be only accessible for water solution, so as to make water solution pass through very slowly. Besides, since the filter cloth, such as geotechnical cloth, is flexible, it is barely to be completely clogging as well. The filter cloth after being clamped can also prevent the invasion of plant roots; as a result, it may not only be capable for surface drip irrigation, but also capable for subsurface seep (drip) irrigation.

2. The flow velocity of water seepage features strong controllability, small outflow, uniformity, stability, and has little sensitivity to pressure change. By adopting a manner of sandwiched filter by two components, the circle of filter cloth at the clamping position is the only channel for water to seep towards to the water outlet. By adjusting the cross-section area of the water seepage of the filter cloth and the compactness at the clamping position, it enables to achieve the object of controlling the flow velocity of water seepage.

3. It is convenient to manufacture, lay and install. The embedded type, inverted-filtering and anti-clogging emitter adopts the structure that the sandwiched filter by two components is mutually fixed with the inner wall of the water pipeline, which is convenient to machine and assemble, and is stable fixation.

BRIEF DESCRIPTION OF THE DRAWINGS

In order to more clearly understand the objects, features and advantages of the present invention, hereinafter, preferred embodiments of the present invention will be described in details by combining with drawings.

DETAILED DESCRIPTION OF THE PREFERRED EMBODIMENTS

First Embodiment

Figure 1:
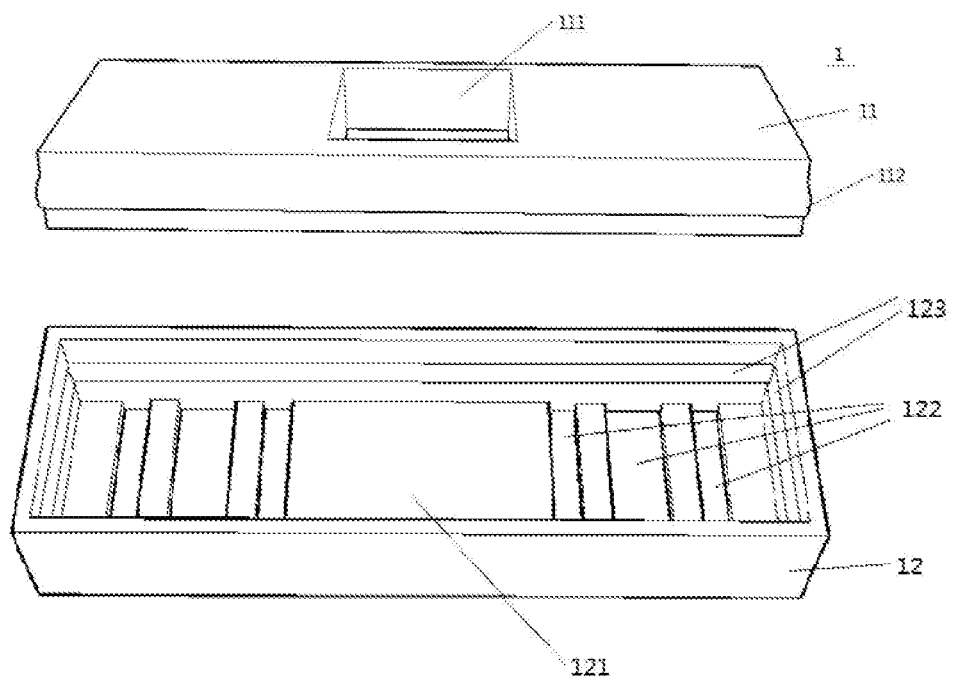
FIG. 1 is a structural diagram of a first embodiment of an embedded type, inverted-filtering and anti-clogging emitter of the present invention.
Figure 2:
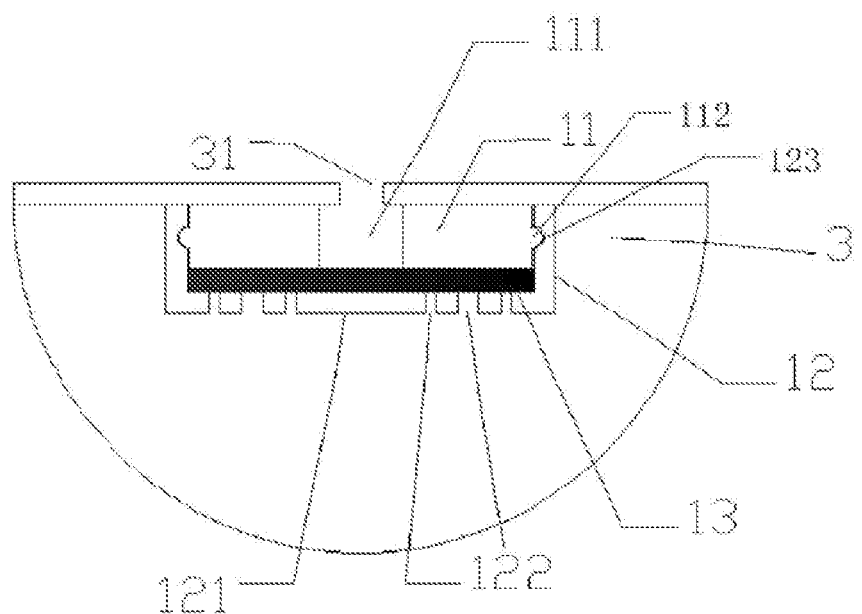
FIG. 2 is a section diagram of the first embodiment of a drip irrigation pipe of the present invention.

Please simultaneously refer to FIG. 1 and FIG. 2, in the first embodiment, an embedded type, inverted-filtering and anti-clogging emitter 1 is arranged at the inner wall of a PE water flexible pipe 3. It comprises a first component 11 of PE material which is fixed to the tube wall of the flexible pipe 3, a second component of PE material which is mutually fixed with the first component 11, and a geotechnical cloth 13 sandwiched between the first component 11 and the second component 12. The flexible pipe 3 is provided with a water outlet 31. The second component 12 is also provided with a plurality of diversion ports 122, which enables the water passing through the water flexible pipe 3 to enter the emitter and to contact with the filter cloth.

Therein, the second component 12 is box-shape; the first component 11 is rectangular shape that enables to snap in the box-shaped second component 12.

Therein, the first component 11 is provided with a hollowed-out portion 111 which is capable of exposing the geotechnical cloth 13 and enabling the geotechnical cloth 13 to correspond with and to be in communication with the water outlet 31. The geotechnical cloth 13 complete covers the hollowed-out portion 111 to form a water seepage portion. The second component 12 is provided with a pressing portion 121 to press the geotechnical cloth 13 against the first component 11. The pressing portion 121 completely covers the hollowed-out portion 111 on the projection plane, and presses against the geotechnical cloth 13 along the edge of the hollowed-out portion 111, such that the water passing through the flexible pipe 3 has to pass through the geotechnical cloth 13 along the direction perpendicular to the clamping forced direction of the geotechnical cloth 13, to enter the hollowed-out portion to seep from the water outlet 31. Besides, the hollowed-out portion 111 is also convenient for punching of the flexible pipe 3. The circle around the hollowed-out portion 111 of the emitter is combined with the inner wall of the flexible pipe around the water outlet 31 by thermal sealing, to make the water seepage portion form a relatively closed space, so that the water passing through the water flexible pipeline seeps after successively passes through the diversion channel 122, geotechnical cloth 13, hollowed-out portion 111, and water outlet 31, i.e., the circle of geotechnical cloth at the position sandwiched between the pressing portion 121 and the edge of the hollowed-out portion 111, is a medium for water seepage, which is also the only medium.

In the meanwhile, by such structure, the compactness of the geotechnical cloth 13 can be adjusted by the interval of the pressing portion 121 between the first component 11 and the second component 12, thus the velocity of water seepage of the whole emitter can be simply and favorable controlled. In the embodiment, the thickness of the geotechnical cloth 13 after being clamped is ⅓ times of its natural thickness. According to experiment, such compactness after being clamped features better velocity of water seepage.

Therein, the geotechnical cloth 13 is extended with a suction portion besides the pressing part pressed by the pressing portion 121, which extends to the diversion port 122, so as to absorb water from the water flexible pipe 3. Such design can further prevent the water inlet channel from being clogging, since the superficial area for absorbing water is increased.

In the embodiment, four sides of the first component 11 are provided with four ribs 112, to snap in four grooves 123 of the inner wall of the second component 12, to mutually fit and sealed fix.

The embodiment adopts flat emitter, which is pasted onto the inner wall of the water flexible pipe 3, and adopts geotechnical cloth as a medium for water seepage. In practical application, it may also adopt composite geotechnical cloth of "one film and one cloth" as the medium for water seepage, for which, one side of the "film" sticks against the pressing portion, and one side of the "cloth" faces the hollowed-out portion, while the length of the composite geotechnical cloth is shorter than that of the present embodiment, so that the diversion port is exposed on the left and right sides, and water can seep from both sides of the composite geotechnical cloth.

The material specification of the water pipeline used in the embodiment is as follows:

Water flexible pipe (i.e., water tape, drip irrigation tape): LDPE flexible pipe, with a wall thickness of 0.6 mm, and an external diameter of 20 mm after being stretched.

The water flexible pipe per 30 cm is provided with one embedded type, inverted-filtering and anti-clogging emitter.

The filter cloth used in the embodiment is a geotechnical cloth of 300 g/m$^2$.

Second Embodiment

Figure 3:
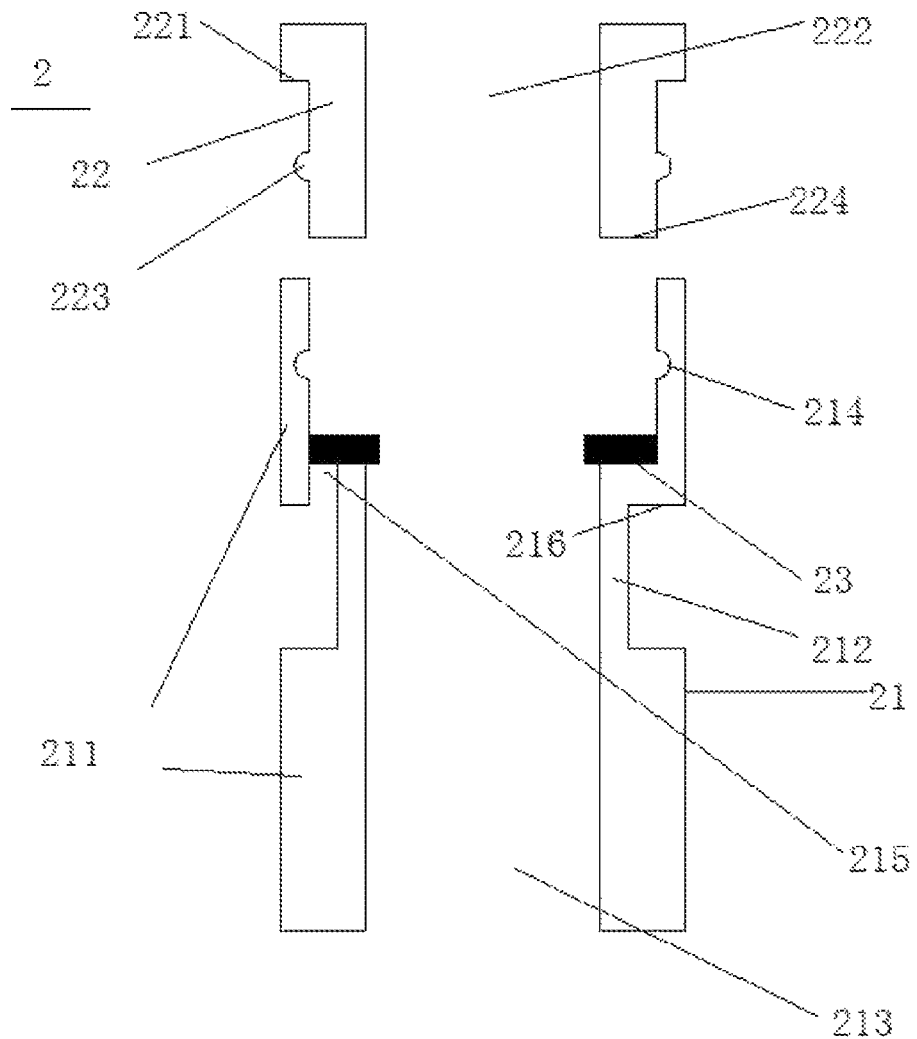
FIG. 3 is a section diagram of a second embodiment of an embedded type, inverted-filtering and anti-clogging emitter of the present invention.
Figure 4:
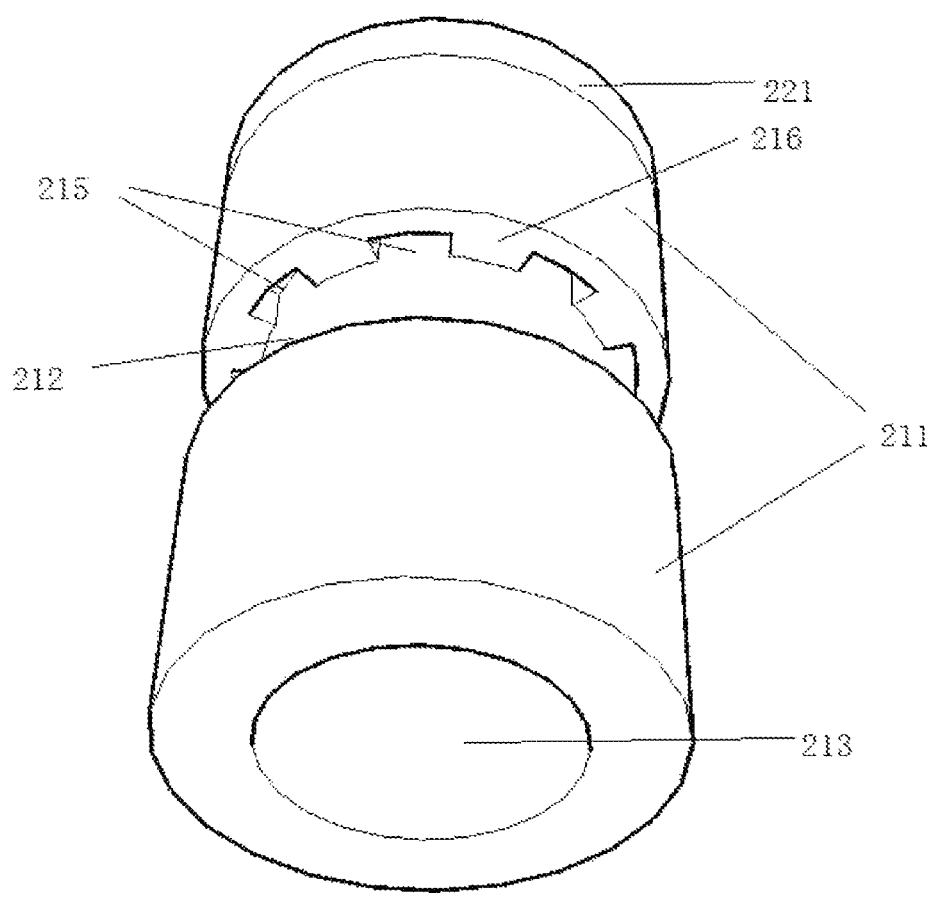
FIG. 4 is a stereogram of the second embodiment of an emitter of the present invention.

Please simultaneously refer to FIG. 3 and FIG. 4, in the second embodiment, a tubular column type, inverted-filtering and anti-clogging emitter 2 comprises a dumbbell-shaped first tubular column assembly 21 of PE material, and a cylinder-shaped second tubular column assembly 22 of PE material that enables to insert into and fix with one end of the first tubular column assembly 21. A circle in the middle of the first tubular column assembly 21 sags inward towards to the axis, to make the whole form a dumbbell-shape structure with broad tubular columns 121 at both ends and a narrow tubular column 212 in the middle. The axis 213 of the first tubular column assembly is coaxial with the axis 222 of the second tubular column assembly and both are transparent in axes, so as to form a diversion channel to enable water to enter the emitter. On the annular surface 216 of the outer wall of the broad tubular column 211 of one end that connects with the outer wall of the narrow tubular column 212, is provided eight water seepage holes 215 along the direction parallel to the axis, e.g., little rectangular windows. The end of the broad tubular column provided with water seepage holes 215 is inserted with the second tubular column assembly 22 and fixed. An inner ring of the water seepage holes 215 of the broad tubular column is protruded against with a top ring 224 of the second tubular column assembly, an annular filter cloth 23 is sandwiched therebetween, and the filter cloth 23 is hollowed to make the axes of the two tubular column assemblies transparent. The water seepage holes 215 exposes part of outer ring of the geotechnical cloth 23 after being pressed, so that water has to pass through the geotechnical cloth 23 along the direction perpendicular to the clamping forced direction of the geotechnical cloth 23, to enter the water seepage holes 215. Meanwhile, the circle of concave position in the middle of the first tubular column assembly 21 corresponds to a water outlet of the water pipeline, while all the exposed geotechnical cloth 23, water seepage holes 215 and concave form the water outlet channel. The circle of concave is also convenient for punching of the pipe wall. The outer walls of the broad tubular columns 211 at both ends of the first tubular column assembly 21 are mutually fixed with the inner wall of the water pipeline, so that the water passing through the water pipeline seeps after successively passes through the transparent axes, the geotechnical cloth 23, the water seepage holes 215, and the circle of concave, i.e., the circle of geotechnical cloth 23 at the position sandwiched between the top ring 224 of the second tubular column assembly and the inner ring of the water seepage holes 215, is a medium for water seepage, which is also the only medium.

In the embodiment, the outer wall of the second tubular column assembly 22 is provided with a ring of rib 223, the end of the broad tubular column 211 provided with water seepage holes has a ring of groove 214 to match with, so that both the first tubular column assembly 21 and the second tubular column assembly 22 can be fixed together. The other end of the second tubular column assembly 22 that opposites to the top ring 224 is also provided with a bump 221, to fasten the top of the first tubular column assembly 21 after assembling. The outer ring of the bump 221 is thermal sealed with the inner wall of the water pipeline, for preventing water from entering the water outlet channel along the aperture between two tubular column assemblies.

By such structure, the compactness of the geotechnical cloth 23 can be adjusted by the interval between the top ring 224 of the second tubular column assembly and the protrusion of inner ring of the water seepage holes 215, thus the velocity of water seepage of the whole emitter can be simply and favorable controlled. In the embodiment, the thickness of the geotechnical cloth 23 after being clamped is ⅓ times of its natural thickness. According to experiment, such compactness after being clamped features better velocity of water seepage.

The present embodiment adopts tubular column type emitter, which is embedded to the inner wall of the water pipeline and adopts geotechnical cloth as a medium for water seepage. In practical application, it may also adopt composite geotechnical cloth of "one film and one cloth" as the medium for water seepage, for which, one side of the "film" sticks against the top ring of the second tubular column assembly, and one side of the "cloth" faces the water seepage holes.

The material specification of the water pipeline used in the embodiment is as follows:

Water flexible pipe (i.e., water tape, drip irrigation tape): LDPE flexible pipe, with a wall thickness of 1.2 mm, and an external diameter of 16 mm after being stretched.

The water flexible pipe per 3 meter is provided with ten embedded type, inverted-filtering and anti-clogging emitter.

The filter cloth used in the embodiment is a geotechnical cloth of 400 g/m².

What is claimed is:

1. An embedded type emitter, which is embedded fixed to an inner wall of a water pipeline, characterized in that, the emitter (2) comprises:
    a dumbbell-shaped tubular column assembly (21) as a first component,
    a cylinder-shaped tubular column assembly (22) as a second component,
    an annular filter cloth (23) sandwiched between the first component and the second component;
    wherein the cylinder-shaped tubular column assembly (22) is coaxial with the dumbbell-shaped tubular column assembly (21), so as to form a diversion channel to enter water to the emitter (2); the cylinder-shaped tubular column assembly (22) snaps into and fixes with one end of the dumbbell-shaped tubular column assembly (21);
    the dumbbell-shaped tubular column assembly (21) consists of broad tubular columns (221) at both ends, a narrow tubular column (212) in the middle and an annular surface (216) that connects an outer wall of the broad tubular column (121) to the narrow tubular column (212); the annular surface (216) is provided with one or more water seepage holes (215) along the direction parallel to the axis, which are capable of exposing the annular filter cloth (23) and enabling the annular filter cloth (23) to correspond with and to be in communication with water outlet of the water pipeline;
    the cylinder-shaped tubular column assembly (22) has a top ring (224), which presses the annular filter cloth (23) against the annular surface (216) of the dumbbell-shaped tubular column assembly (21) and completely covers the water seepage holes (215) on a projection plane, so that water in the water pipeline has to successively pass through the top ring (224), the annular filter cloth (23), and water seepage holes (215) to the water outlet of the water pipeline.

2. The embedded type, inverted-filtering and anti-clogging emitter according to claim 1, characterized in that: the outer wall of the second tubular column assembly is provided with a rib or groove, the end of the broad tubular column provided with water seepage holes has a groove or rib mutually matched with the rib or groove of the second tubular column assembly.

3. The embedded type, inverted-filtering and anti-clogging emitter according to claim 1, characterized in that: the annular filter cloth is geotechnical cloth, and the thickness of the geotechnical cloth after being clamped is ¼~⅓ times of natural thickness.

4. A drip irrigation pipeline having the embedded type, inverted-filtering and anti-clogging emitter according to claim 1, characterized in that: it comprises a pipeline body and a plurality of above emitters arranged at the inner wall of the pipeline body.

* * * * *